J. D. Leach,
Surveying Inst.
N° 92,197.
Patented July 6. 1869.

Witnesses
J. L. Taylor
C. Pearson

Inventor
J. D. Leach
By T. W. Porter
Atty

United States Patent Office.

J. D. LEACH, OF PENOBSCOT, MAINE, ASSIGNOR TO HIMSELF, SABIN HUTCHINGS, AND SEWELL LEACH, OF SAME PLACE.

Letters Patent No. 92,197, dated July 6, 1869.

IMPROVEMENT IN NAVIGATORS' BEARING-INDICATOR.

The Schedule referred to in these Letters Patent and making part of the same.

*To all whom it may concern:*

Be it known that I, J. D. LEACH, of Penobscot, in the county of Hancock, and State of Maine, have invented a new and useful Navigators' Bearing-Indicator; and I do hereby declare that the following is a full, clear, and exact description of the construction and operation of the same, which, taken in connection with the drawings which accompany and make part of this specification, will enable those skilled in the art to which it appertains, to make and use my invention.

This invention relates to a device by which navigators are enabled to determine, either by day or night, the exact bearing or direction of any light-house, headland, or other object by which they may be shaping the course of their vessel; and It consists in attaching to the binnacle or compass-case a revolving hub or disk, in the top of which is inserted a removable support, having pivoted thereto, to move vertically, a tube or other device for sighting the land-mark, while from the bottom of the disk two arms depend, coinciding with the sighting-tube, and which, when the tube is sighted upon the land-mark, shall indicate upon the card of the compass the direction or bearing thereof.

Similar letters of reference indicate corresponding parts in the several figures.

In the drawings—

A represents the binnacle;

B, the compass-case; and

C, the compass.

*a* is a thimble or bushing, inserted in the top of the binnacle; and

*b* is a hub, which revolves freely in thimble *a*.

*c* is an upright, which is inserted in hub *b*; and

*d* is a tube, pivoted to the top of *c*, in such manner that its ends may have a rising and falling motion when necessary.

*e* is a rod, rigidly attached to hub *b*, and depending therefrom to any required distance.

*f f* is a semicircle, which at its apex is firmly secured to rod *e*, while the ends terminate at or near the outside of the compass *c*, at such distance therefrom as the movements of the compass in rough weather shall render necessary.

Figure 1:
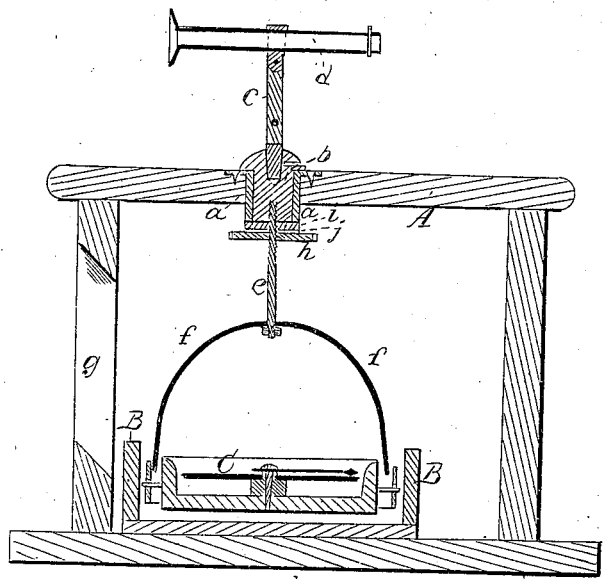
Figure 1 is a vertical section of my invention, and a compass to which it is applied, also shown in section.
Figure 3:
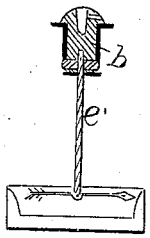
Figure 3 is a detached view, showing a modification of the indicator.
Figure 2:
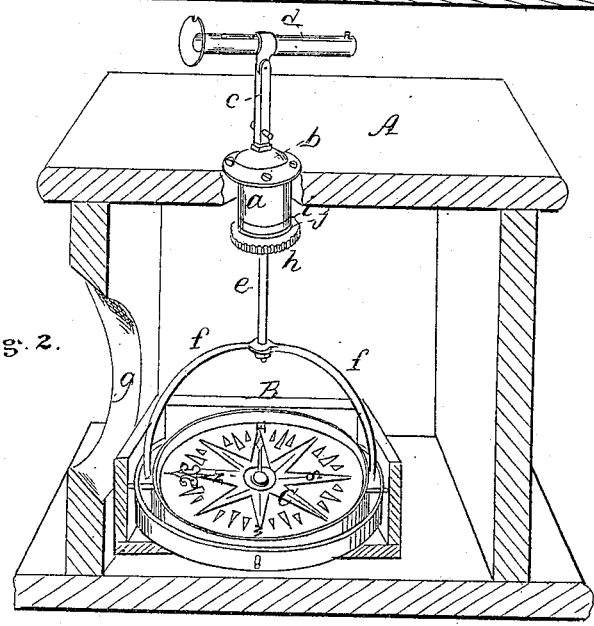
Figure 2 is a perspective view of my invention applied to a compass.

In fig. 3, the rod *e* descends to near the compass-card, when a horizontal rod or indicator, *f*, is pivoted thereto, in the same manner as tube *d* is pivoted to rod *c*, so that the indicator, by its own balance, shall remain parallel with the face of the compass-card, this indicator being peculiarly adapted to liquid-compasses.

The rod *c* is so formed that it can only be inserted in the hub *b* when the tube *d* coincides in direction with the indicators *f f*.

*i* is a disk, of rubber, which bears against the lower end of hub *b*, and beneath this rubber is a metallic washer, *j*, while

*h* is a screw-disk, moving upon a screw cut upon rod *e*, and by which to regulate the force required to turn hub *b*, to prevent its revolving except when in use.

The tube *d* may be used for sighting lights in the night, and by day sights or other devices may be used for the same purpose.

In practice, the navigator rotates and elevates the tube *d* to such position as to sight the object by which he is shaping the course of his vessel, and then, by observing the relative positions of indicator *f* and the points upon the compass-card, he has pointed out thereby the exact bearing or direction of the land-mark from the position his ship then occupies, and is enabled to shape his course as accurately as if steering by compass upon the ocean; whereas, by the ordinary method of determining the bearings of land-marks, it is impossible to be more accurate than to observe both the compass and the object, and then guess or judge as to their relative directions.

Having thus described my invention,

What I claim as new, and desire to secure by Letters Patent, is—

1. Combining with a mariner's compass a mechanical device which, when sighted or brought to bear upon any object, shall indicate upon the compass the direction or bearing of such object.

2. The indicator, substantially as described and shown, and for the purposes specified.

J. D. LEACH.

Witnesses:
T. W. PORTER,
HENRY HYDE SMITH.